US012424108B2

United States Patent
Wang et al.

(10) Patent No.: US 12,424,108 B2
(45) Date of Patent: Sep. 23, 2025

(54) UNMANNED AERIAL VEHICLE AND METHOD FOR AN UNMANNED AERIAL VEHICLE FOR GENERATING A TEMPORARY FLIGHT-PLAN FOR A REGION

(71) Applicant: Sony Group Corporation, Tokyo (JP)

(72) Inventors: Bi Wang, Stuttgart (DE); Florian Becker, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 413 days.

(21) Appl. No.: 17/909,765

(22) PCT Filed: Mar. 11, 2021

(86) PCT No.: PCT/EP2021/056147
§ 371 (c)(1),
(2) Date: Sep. 7, 2022

(87) PCT Pub. No.: WO2021/185666
PCT Pub. Date: Sep. 23, 2021

(65) Prior Publication Data
US 2023/0109390 A1  Apr. 6, 2023

(30) Foreign Application Priority Data
Mar. 20, 2020  (EP) .................................... 20164569

(51) Int. Cl.
*G08G 5/32*  (2025.01)
*G08G 5/25*  (2025.01)
(Continued)

(52) U.S. Cl.
CPC ................. *G08G 5/32* (2025.01); *G08G 5/25* (2025.01); *G08G 5/26* (2025.01); *G08G 5/55* (2025.01);
(Continued)

(58) Field of Classification Search
CPC ............... G08G 5/32; G08G 5/25; G08G 5/26
See application file for complete search history.

(56) References Cited

U.S. PATENT DOCUMENTS 9,927,807 B1 * 3/2018 Ganjoo .................... G08G 5/26
2010/0023247 A1   1/2010 Sandell et al.
(Continued)

FOREIGN PATENT DOCUMENTS

CN   110800221 A   2/2020

OTHER PUBLICATIONS

International Search Report and Written Opinion mailed on Jun. 9, 2021, received for PCT Application PCT/EP2021/056147, filed on Mar. 11, 2021, 10 pages.

*Primary Examiner* — Erin M Piateski
*Assistant Examiner* — Gabriel Joseph Rene Lambert
(74) *Attorney, Agent, or Firm* — XSENSUS LLP

(57) ABSTRACT

A method for an Unmanned Aerial Vehicle, UAV, for generating a temporary flight-plan for a region is provided. The method includes determining whether any air traffic control station is emitting a flight-plan for the region. If it is determined that no air traffic control station is emitting a flight-plan for the region, the method further includes determining a score for the UAV based on properties of the UAV and receiving scores from other UAVs within the region. Additionally, the method includes determining whether the UAV is a master UAV or a slave UAV for generating the temporary flight-plan based on the calculated score for the UAV and the received scores from the other UAVs. If it is determined that the UAV is a master UAV, the method includes performing a first task in generating the temporary flight-plan.

20 Claims, 4 Drawing Sheets

(51) Int. Cl.
*G08G 5/26* (2025.01)
*G08G 5/55* (2025.01)
*G08G 5/57* (2025.01)
*G08G 5/59* (2025.01)
*G08G 5/80* (2025.01)

(52) U.S. Cl.
CPC .............. *G08G 5/57* (2025.01); *G08G 5/59* (2025.01); *G08G 5/80* (2025.01)

(56) References Cited

U.S. PATENT DOCUMENTS

| | | | |
|---|---|---|---|
| 2017/0069214 A1* | 3/2017 | Dupray | G08G 5/56 |
| 2018/0120836 A1* | 5/2018 | Hardee | G05D 1/0011 |
| 2019/0019418 A1* | 1/2019 | Tantardini | G05D 1/104 |
| 2019/0025818 A1* | 1/2019 | Mattingly | H04W 4/46 |
| 2019/0043368 A1 | 2/2019 | Priest | |
| 2020/0005656 A1* | 1/2020 | Saunamaeki | G05D 1/104 |
| 2020/0013296 A1 | 1/2020 | Kao | |
| 2020/0120563 A1* | 4/2020 | Takács | G08G 5/32 |
| 2020/0160734 A1* | 5/2020 | Priest | G08G 5/58 |

\* cited by examiner

UNMANNED AERIAL VEHICLE AND METHOD FOR AN UNMANNED AERIAL VEHICLE FOR GENERATING A TEMPORARY FLIGHT-PLAN FOR A REGION

CROSS-REFERENCE TO RELATED APPLICATIONS

The present application is based on PCT filing PCT/EP2021/056147, filed Mar. 11, 2021, which claims priority to EP 20164569.4, filed Mar. 20, 2020, the entire contents of each are incorporated herein by reference.

FIELD

The present disclosure relates to flight-planning for an Unmanned Aerial Vehicle (UAV). In particular, examples relate to an UAV and a method for an UAV for generating a temporary flight-plan for a region.

BACKGROUND

With the rapidly increasing number of UAVs, the importance of Air Traffic Control (ATC) is increasing. In heavily populated air routes, ATC should exist similar to traffic lights for ground vehicles. However, ATC may be unexpectedly offline, or an UAV may enter area which is not provided with ATC. In areas without ATC service, the possibility for a UAV of a collision with another UAV is increased.

Hence, there may be a demand for UAV coordination in a region which is at least temporary not served by ATC.

SUMMARY

This desire is met by apparatuses and methods in accordance with the independent claims. Advantageous embodiments are addressed by the dependent claims.

According to a first aspect, the present disclosure provides a method for an UAV for generating a temporary flight-plan for a region. The method comprises determining whether any ATC station is emitting a flight-plan for the region. If it is determined that no ATC station is emitting a flight-plan for the region, the method further comprises determining a score for the UAV based on properties of the UAV and receiving scores from other UAVs within the region. Additionally, the method comprises determining whether the UAV is a master UAV or a slave UAV for generating the temporary flight-plan based on the determined score for the UAV and the received scores from the other UAVs. If it is determined that the UAV is a master UAV, the method comprises performing a first task in generating the temporary flight-plan. If it is determined that the UAV is a slave UAV, the method includes performing a second task in generating the temporary flight-plan.

According to a second aspect, the present disclosure provides an UAV comprising a plurality of rotors and circuitry configured to determine whether any ATC station is emitting a flight-plan for a region. If it is determined that no ATC station is emitting a flight-plan for the region, the circuitry is further configured to determine a score for the UAV based on properties of the UAV and receive scores from other UAVs within the region. The circuitry is configured to determine whether the UAV is a master UAV or a slave UAV for generating the temporary flight-plan based on the determined score for the UAV and the received scores from the other UAVs. If it is determined that the UAV is a master UAV, the circuitry is configured to perform a first task in generating the temporary flight-plan. If it is determined that the UAV is a slave UAV, the circuitry is configured to perform a second task in generating the temporary flight-plan.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
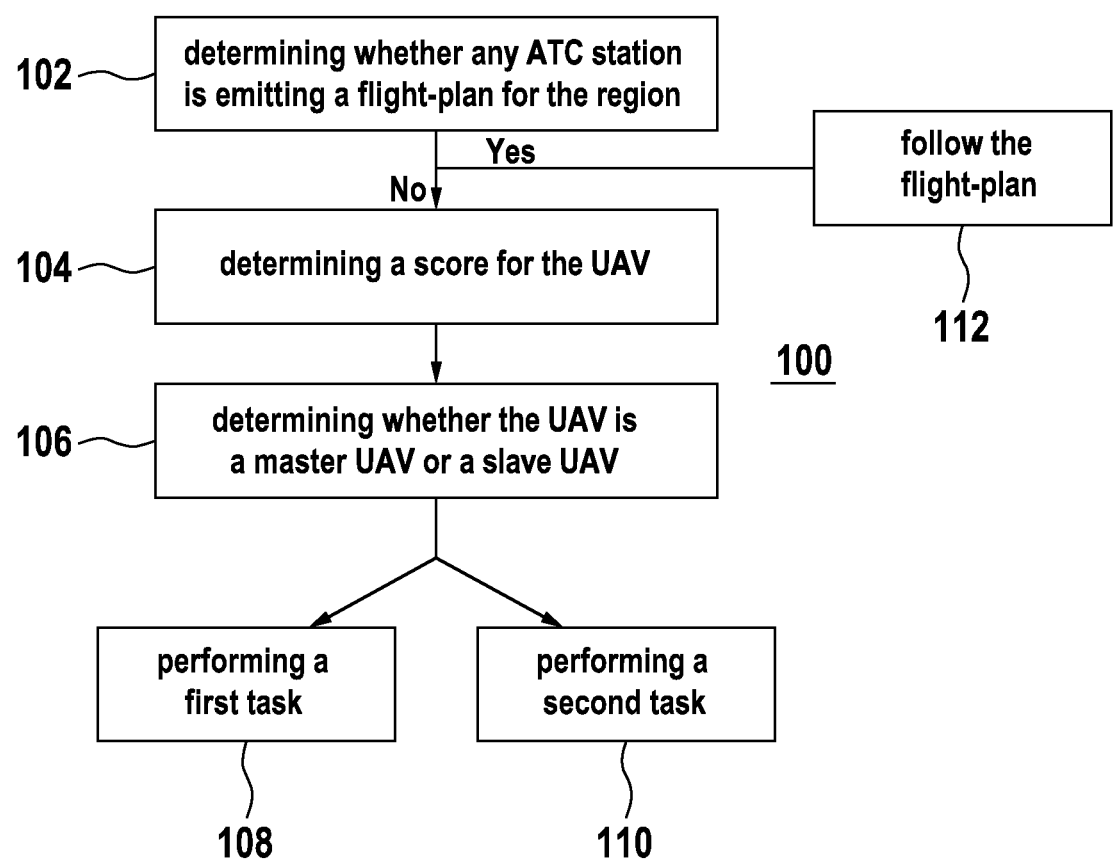
FIG. 1 illustrates a flowchart of an example of a method for an UAV for generating a temporary flight-plan for a region.

FIG. 1 illustrates a flowchart of a method 100 for an UAV for generating a temporary flight-plan for a region. A flight-plan describes a respective temporal-spatial region which is exclusively reserved for a respective UAV while it navigates in the region. The flight-plan may comprise the respective reserved temporal-spatial region for each or at least part of the UAVs moving (navigating) in the region. The region is a predefined geographical region. For example, the flight-plan may comprise a 3D (three-dimensional) position over time (i.e. a trajectory) and optionally the shape and size of a reserved surrounding space for the respective UAV. The surrounding space may, e.g., cover the UAV extent and optionally a cargo extent and further safety margins in order to compensate external influences (e.g. wind), navigation uncertainties of the UAV and/or sensor uncertainties of the UAV (e.g. position sensor uncertainties).

The method 100 comprises determining 102 whether any ATC station is emitting a flight-plan for the region. An ATC station is a station providing ATC for a respective region, inter alia by emitting a flight-plan for this region. If it is determined that an ATC station is emitting a flight-plan for the region, the method 100 comprises following 112 the flight-plan for the region as received from the ATC station in order to safely navigate through the region.

In case that no ATC station is emitting a flight-plan for the region, the chance for a collision with another UAV moving in the region is increased. Therefore, if it is determined that no ATC station is emitting a flight-plan for the region, a procedure for generating a temporary flight-plan for the region is initiated at the UAV in order to safely guide the UAV and also the other UAVs in the region. For generating the temporary flight-plan, a large number of tasks (e.g. calculations) may be necessary which may overload a single UAV. Therefore, the UAV works together with other UAVs in the region in order to generate the temporary flight-plan as will be described in the following.

If it is determined that no ATC station is emitting a flight-plan for the region, the method 100 comprises determining 104 a score for the UAV based on properties of the UAV and receiving scores from other UAVs within the region. Based on the scores, the performances of the UAVs may be compared and UAVs suitable for generating the temporary flight-plan may be determined.

Therefore, the method 100 comprises determining 106 whether the UAV is a master UAV or a slave UAV for generating the temporary flight-plan based on the calculated score for the UAV and the received scores from the other UAVs. The master UAV is the UAV among the UAVs in the region exhibiting the highest performance. The slave UAVs are UAVs exhibiting lower score and, hence, lower performance than the master UAV.

The tasks for generating the temporary flight-plan are distributed between the UAVs based on their respective performance. Accordingly, if it is determined that the UAV is a master UAV, the method 100 for the UAV comprises performing 108 a first task in generating the temporary flight-plan. On the other hand, if it is determined that the UAV is a slave UAV, the method 100 for the UAV comprises performing 110 a second task in generating the temporary flight-plan.

The method 100 may allow to generate a temporary flight-plan for the region using the combined performance of the UAVs navigating (moving) in the region. By generating the temporary flight-plan, the flight of the UAVs in the region may be much safer. For example, if the ground ATC station for the region is offline (e.g. due to a technical defect) or if the UAV is moving in region which is not served (covered) by an ATC station (e.g. a dessert or a mountain area), collisions between the UAVs may be avoided due to the temporary flight-plan.

By distributing the tasks for generating the temporary flight-plan between the UAVs based on their respective performance (as indicated by the score), the efficiency of generating the temporary flight-plan may be increased. Further, generating the temporary flight-plan does not require the ATC station to be online in time. The UAVs are able to autonomously generate the temporary flight-plan. Accordingly, the UAVs do not blindly go further or need to stop (e.g. wait in the air or land on the ground) and wait for the ATC station to be back online. This is advantageous as the power stored in the batteries of the UAVs is limited. Generating the temporary flight-plan according to the method 100 allows the UAVs to safely navigate through the region with little additional power consumption.

Further, for places not covered by an ATC station (e.g. because building and/or operating an ATC station is too expensive), the temporary flight-plan generation according to the method 100 may allow a trade-off between cost with efficiency and safety.

Figure 2:
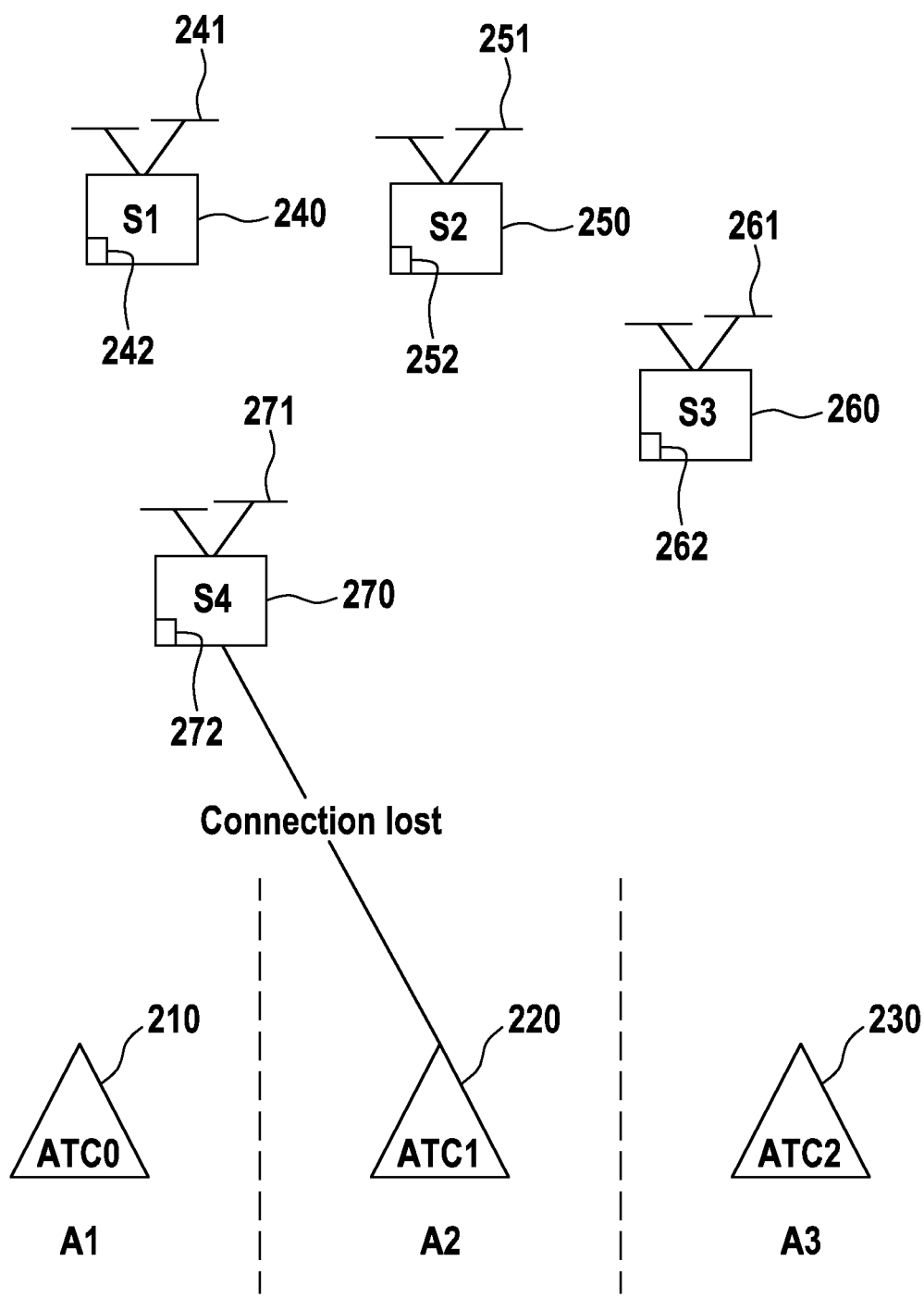
FIG. 2 illustrates an example arrangement of UAVs and ATC stations.

In the following, the method 100 will be described more detailed with reference to FIGS. 2 to 4. FIG. 2 illustrates an exemplary situation with three ATC stations 210, 220 and 230. Each of the three ATC stations covers (serves) a respective geographical region $A_1$, $A_2$ and $A_3$. Further, four UAVs 240, 250, 260 and 270 are up in the air for travelling to their respective destination. In addition to a respective plurality of rotos 241, 251, 261 and 271, each of the UAVs 240, 250, 260 and 270 comprises respective circuitry 242, 252, 262 and 272 configured to perform the method 100. The circuitry 242, 252, 262 and 272 may, e.g., comprise respective data processing circuitry and respective wireless communication circuitry. For example, the processing circuit may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit may optionally be coupled to, e.g., read only memory (ROM) for storing software, random access memory (RAM) and/or non-volatile memory.

Figure 3:
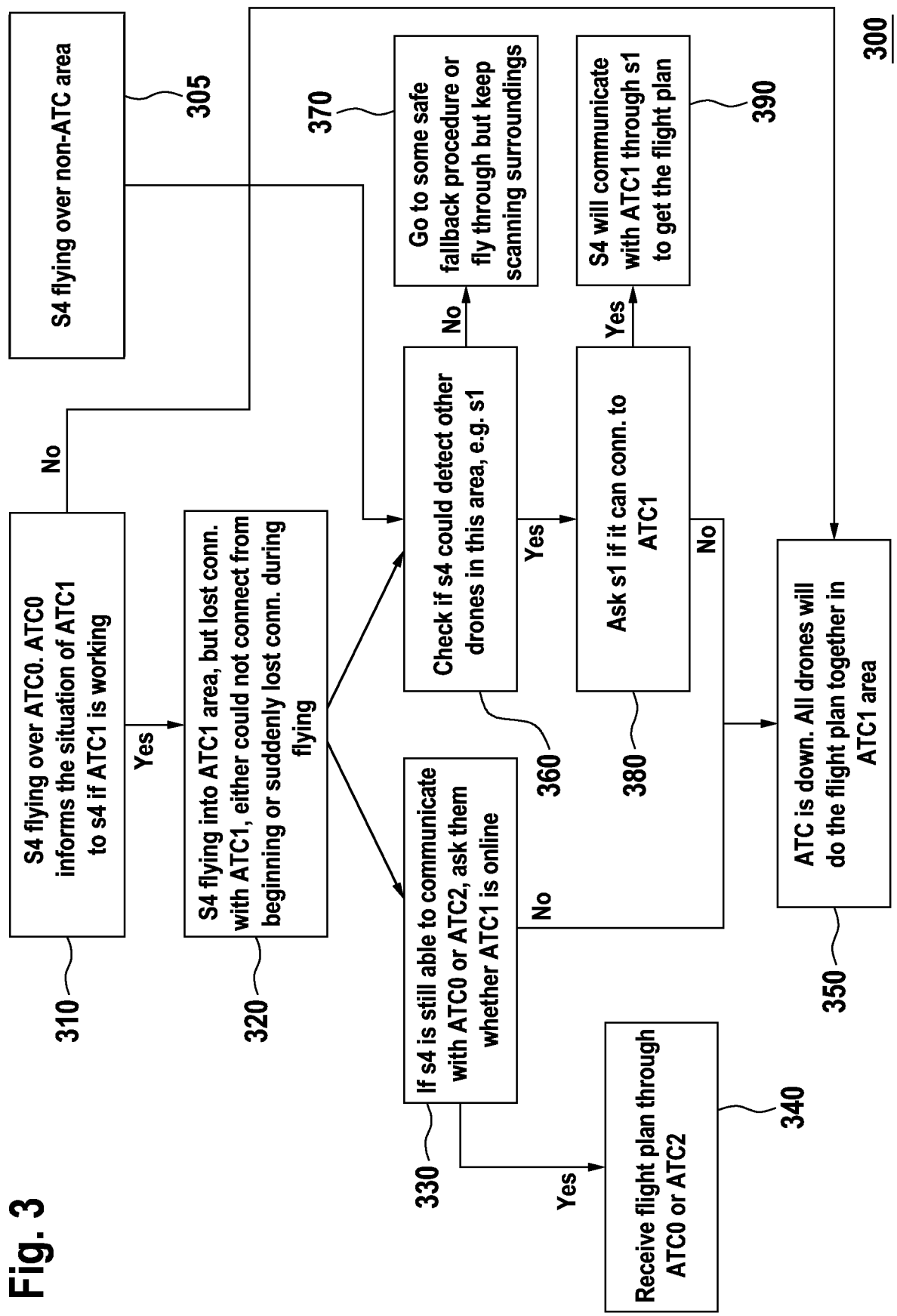
FIG. 3 illustrates a flowchart of an example for determining whether any air traffic control station is emitting a flight-plan for the region.
Figure 4:
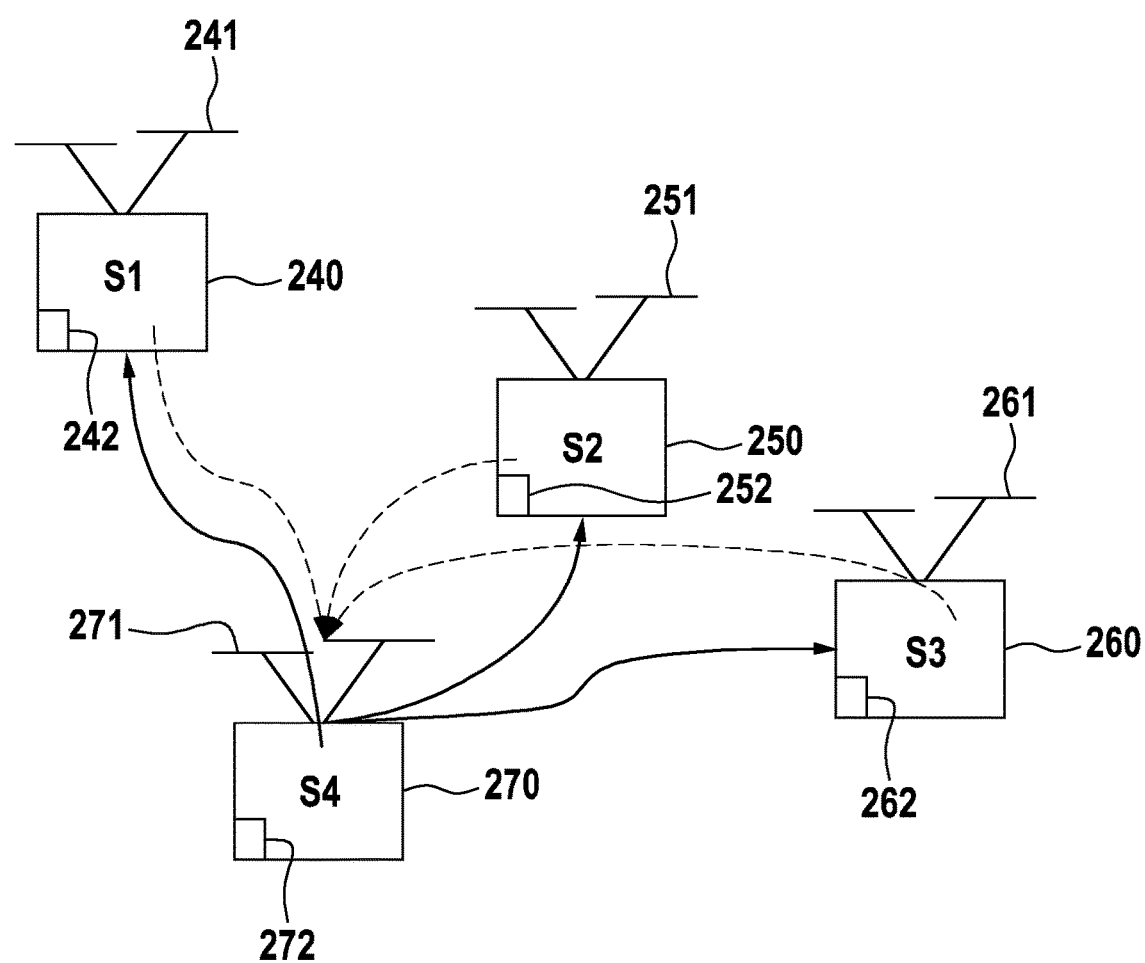
FIG. 4 illustrates an exemplary data exchange between UAVs.

The situation illustrated in FIG. 2 is further depicted in the flowchart 300 of FIG. 3. The UAV 270 is initially flying over the region $A_1$ covered (served) by the ATC station 210. The ATC station 210 is online and informs the UAV 270 about the flight-plan for the region $A_1$ (see element 310 in FIG. 3). Subsequently, the UAV 270 enters the region $A_2$ to be covered (served) by the ATC station 220. However, no connection between the ATC station 220 and the UAV 270 is possible because the ATC station 220 is offline. For example, a previously existing connection to the ATC station 220 emitting the flight-plan for the region $A_2$ may be lost (interrupted) or it may be not possible for the UAV 270 to establish a connection to the ATC station 220 at all (see element 320 in FIG. 3). Accordingly, the UAV 270 determines that a previously existing connection to the ATC station 220 emitting the flight-plan for the region $A_2$ is lost or that it is not possible to establish a connection to the ATC station 220.

In order to check whether the ATC 220 is indeed offline or only the UAV 270 experiences connection problems, the UAV 270 requests at least one of the ATC stations 210 and 230 to check whether the ATC station 210, 230 is able to connect to the ATC station 220 (see element 330 in FIG. 3). If the UAV 270 receives from one of the ATC stations 210 and 230 information that the ATC station 210, 230 is able to connect to the ATC station 220, the UAV 270 requests the one of the ATC stations 210 and 230 to obtain the flight-plan for the region $A_2$ from the ATC station 220 and transmit it to the UAV 270 (see element 340 in FIG. 3).

On the other hand, if the UAV receives from one of the ATC stations 210 and 230 information indicating that the ATC station 210, 230 is not able to connect to the ATC station 220, the UAV 270 determines that no ATC station is emitting a flight-plan for the region $A_2$. In other words, if the UAV 270 is informed by one of the ATC stations 210 and 230 that the ATC station 220 is offline because the ATC stations 210 and 230 did not receive a response from the ATC station 220, the ATC station 220 is confirmed to be offline by the UAV 270. For example, the UAV 270 may emit information indicating that the ATC station 220 is offline to the other UAVs. Alternatively or additionally, the ATC stations 210 and 230 may emit information indicating that the ATC station 220 is offline to the other UAVs. Accordingly, the UAVs 240, 250, 260 and 270 will work together to generate a temporary flight-plan for the region $A_2$ as described above (see element 350 in FIG. 3).

The flowchart of FIG. 3 further illustrates another method for determining whether any ATC station is emitting a flight-plan for the region $A_2$. For example, the UAV 270 may perform this method if it did not receive any information (messages) from one of the other ATC stations 210 and 220.

If it is determined by the UAV 270 that a previously existing connection to the ATC station 220 emitting the flight-plan for the region $A_2$ is lost or that it is not possible to establish a connection to the ATC station 220 at all, the UAV 270 attempts to establish a connection to one of the other UAVs 240, 250 and 260 it previously detected (see element 360 in FIG. 3).

If the connection to the one of the other UAVs 240, 250 and 260 cannot be established, the UAV 270 determines that it encounters a connection problem and performs a fallback procedure (see element 370 in FIG. 3). For example, the UAV 270 may land on the ground and perform a reset (reboot) procedure, request a pick-up or request repair. Alternatively, the UAV 270 may continue its flight and scan its surrounding for other UAVs 270. For example, the UAV 270 may activate one or more sensors for scanning its surrounding for other UAVs 270 or switch to a scanning mode with increased accuracy in order to detect and avoid collisions with other UAVs.

If the connection to the one of the other UAVs 240, 250 and 260 can be established, the UAV 270 requests the one of the other UAVs 240, 250 and 260 to connect to the ATC station 220 (see element 380 in FIG. 3). If the UAV 270 receives from the one of the other UAVs 240, 250 and 260 information indicating that one of the other UAVs 240, 250 and 260 is able to connect to the ATC station 220, the UAV 270 establishes a connection to the first ATC center via the one of the other UAVs 240, 250 and 260. Accordingly, the UAV 270 may request and receive the flight-plan for the region $A_2$ through the one of the other UAVs 240, 250 and 260 (see element 390 in FIG. 3). In other words, the UAV 270 uses the one of the other UAVs 240, 250 and 260 as a relay for requesting and receiving the flight-plan for the region $A_2$.

If the UAV 270 receives from the one of the other UAVs 240, 250 and 260 information indicating that one of the other UAVs 240, 250 and 260 is not able to connect to the ATC station 220, the UAV 270 determines that no ATC station is emitting a flight-plan for the region $A_2$. In other words, if the other UAVs 240, 250 and 260 are also not able to connect to the ATC station 220, the ATC station 220 is confirmed to be offline by the UAV 270. Accordingly, the UAVs 240, 250, 260 and 270 will work together to generate a temporary flight-plan for the region $A_2$ as described above (see element 350 in FIG. 3).

Further, if the UAV 270 determines that it entered a region not served by an ATC station, it may attempt to establish a connection to one of the other UAVs 240, 250 and 260 (see elements 305 and 360 in FIG. 3). For example, the UAV 270 may be informed by other UAVs or by another ATC station that is about to enter a region not served by an ATC station. In some examples, the UAV 270 may determine based on map data that it is about to enter a region not served by an ATC station. Accordingly, also the other UAVs cannot establish a connection to an ATC station emitting a flight plan for the region such that the UAVs will work together to generate a temporary flight-plan for the region $A_2$ as described above (see element 350 in FIG. 3).

For generating the temporary flight-plan, a large number of tasks (e.g. calculations) may be required which cannot be done by a single UAV. In order to accomplish the tasks in a distributed manner, a "master-slave" technique is used according to method 100.

As described above, the UAV 270 determines a score and receives scores from the other UAVs 240, 250 and 260 in order to determine which of the UAVs is a master UAV and which UAVs are slave UAVs. In other words, each UAV may calculate its own score for the later selection of "master" and "slaves".

As described above, the score for the UAV 270 is determined based on properties of the UAV 270. For examples, the properties of the UAV 270 may comprise at least one of the following: an amount of surplus energy available at the UAV 270, a computational capability of the UAV 270, and a connection quality of the UAV 270 to the other UAVs 240, 250 and 260.

The amount of surplus energy available at the UAV 270 is the remaining energy available at the UAV 270 after excluding the energy for scheduled tasks of the UAV 270. For example, the amount of surplus energy E may be determined by subtracting a reserved (booked) amount of energy for travelling to the destination of the UAV 270 (e.g. the booked energy for delivering a cargo) from the current total energy stored in a battery of the UAV 270. Taking into account the amount of surplus energy available at the UAV 270 may guarantee both the success of generating the temporary flight-plan and performing the individual tasks of the UAV 270.

The connection quality Q of the UAV 270 to the other UAVs 240, 250 and 260 may, e.g., be determined based on the number of reliable communication connections to the other UAVs 240, 250 and 260. Taking into account the connection quality may ensure that the UAV 270 can receive and send transmit data reliably and efficiently to the other UAVs.

The computational capability P of the UAV 270 may, e.g., be based on (be a function of) a number of processors or processor cores of the UAV 270 (e.g. Central Processing Units, CPUs), frequencies of the processors or processor cores and/or the total processing power of the UAV 270. Taking into account the computational capability (power) may allow to reflect how powerful the UAV 270 is in generating the temporary flight-plan.

Accordingly, the score S of the UAV 270 may be a function of the amount of surplus energy E, the connection quality Q and the computational capability P. The score S may be calculated based on the above quantities, less quantities, additional quantities or different quantities using a specific score function, which should be the same for all UAVs. The score function may, e.g., be a prototype, a piece of software or a dedicated chip which has access to the information and calculates the score.

For example, the UAV 270 and the other UAVs 240, 250 and 260 may each create an initial table with a dictionary in which its own ID and score exist. Then, all the UAVs start emitting (e.g. broadcasting) their own tables and receiving the tables of the others. The local table of the respective UAV may be continuously updated based on the received information (tables). This process may run for a certain time and then stop such that all local tables at the UAVs 240, 250, 260 and 270 may be assumed to be identical. The exchange of the scores between the UAVs 240, 250, 260 and 270 is exemplarily illustrated in FIG. 4 by respective arrows. In summary, each UAV determines a respective score for the UAV based on properties of the UAV, transmit its score to other UAVs within the region $A_2$, and receives scores from other UAVs within the region $A_2$. By calculating the individual scores based on the UAV information, qualified UAVs for generating the temporary flight-plan may be selected.

The temporary flight-plan generation (making) is split between the master UAV and the slave UAVs. For example, the UAV 270 may exhibit the highest score and be determined as the master UAV. Accordingly, the other UAVs 240, 250 and 260 may be determined to be slave UAVs. In accordance with method 100, the UAV 270, hence, performs the first task in generating the temporary flight-plan.

Performing the first task in generating the temporary flight-plan comprises determining calculation tasks for generating the temporary flight-plan and transmitting the calculation tasks to the other UAVs 240, 250 and 260. In other words, the master UAV 270 formulates the full calculation task and splits it into N parts. N is the number of slave UAVs, e.g. N=3 in the example of FIGS. 2 to 4. Subsequently, the master UAV 270 sends out the tasks to the individual slave UAVs 240, 250 and 260.

The slave UAVs receive the tasks from the master UAV and send back the result after calculation. Accordingly, performing the first task in generating the temporary flight-plan further comprises receiving solutions for the calculation tasks from the other UAVs 240, 250 and 260. The master UAV 270 determines the temporary flight-plan based on the received solutions for the calculation tasks and emits the determined temporary flight-plan to the other UAVs 240, 250 and 260. In other words, the master UAV 270 determines (e.g. calculates) the final flight-plan and emits (e.g. broadcasts) it to all UAVs.

According to some examples, the master UAV 270 does not determine and transmit calculation tasks to all of the other UAVs 240, 250 and 260. For example, UAVs which have a very low (or too low) score may be excluded from the selection as they cannot substantially con-tribute to the flight-plan generation. Accordingly, performing the first task in generating the temporary flight-plan for the region $A_2$ may further comprise determining which of the other UAVs 240, 250 and 260 exhibit a score satisfying a predetermined condition such that the master UAV 270 determines calculation tasks only for UAVs among the other UAVs 240, 250 and 260 which exhibit a score satisfying the predetermined condition. For example, if the UAV 240 exhibits a too low score, the master UAV 270 determines calculation tasks only for the UAVs 250 and 260 and hence, only transmits calculation tasks to the UAVs 250 and 260.

In an alternative example, another UAV than the UAV 270 may exhibit the highest score (e.g. the UAV 250) such that the UAV 270 may be determined to be a slave UAV. In accordance with method 100, the UAV 270, hence, performs the second task in generating the temporary flight-plan comprises. As described above, the slave UAV 270 receives a calculation task for generating the temporary flight-plan from one of the other UAVs that is acting as the master UAV. The slave UAV 270 determines a solution for the received calculation task and transmits the solution for the calculation task to the one of the other UAVs acting as the master UAV. Once the master UAV generated the temporary flight-plan based on the solution provided by the slave UAV 270, the master UAV will emit the temporary flight-plan such that the UAV 270 can receive it and navigate according to the temporary flight-plan.

The proposed technology may allow to generate a temporary flight-plan for the region using the combined performance of the UAVs navigating (moving) in the region. By generating the temporary flight-plan, the flight of the UAVs in the region may be much safer. In particular, the proposed technology may enable a mobile drop in central flight-planning.

The Following Examples Pertain to Further Embodiments:
(1) A method for an UAV for generating a temporary flight-plan for a region, the method comprising:
  determining whether any ATC station is emitting a flight-plan for the region;
  if it is determined that no ATC station is emitting a flight-plan for the region, determining a score for the UAV based on properties of the UAV and receiving scores from other UAVs within the region;
  determining whether the UAV is a master UAV or a slave UAV for generating the temporary flight-plan based on the determined score for the UAV and the received scores from the other UAVs;
  performing a first task in generating the temporary flight-plan if it is determined that the UAV is a master UAV; and
  performing a second task in generating the temporary flight-plan if it is determined that the UAV is a slave UAV.
(2) The method of (1), wherein performing the first task in generating the temporary flight-plan comprises:
  determining calculation tasks for generating the temporary flight-plan;
  transmitting the calculation tasks to at least part of the other UAVs;
  receiving solutions for the calculation tasks from at least part of the other UAVs; and determining the temporary flight-plan based on the received solutions for the calculation tasks.
(3) The method of (2), wherein performing the first task in generating the temporary flight-plan for the region further comprises determining which of the other UAVs exhibit a score satisfying a predetermined condition, wherein the UAV determines calculation tasks only for UAVs among the other UAVs which exhibit a score satisfying the predetermined condition.
(4) The method of any of (1) to (3), wherein performing the second task in generating the temporary flight-plan comprises:
  receiving a calculation task for generating the temporary flight-plan from one of the other UAVs;

determining a solution for the received calculation task; and transmitting the solution for the calculation task to the one of the other UAVs.

(5) The method of any of (1) to (4), wherein the properties of the UAV comprise at least one of the following: an amount of surplus energy available at the UAV, a computational capability of the UAV, and a connection quality of the UAV to the other UAVs.

(6) The method of any of (1) to (5), wherein determining whether any ATC station is emitting a flight-plan for the region comprises:

determining that a previously existing connection to a first ATC station emitting a flight-plan for the region is lost or that it is not possible to establish a connection to the ATC station;

requesting at least a second ATC station to check whether the second ATC station is able to connect to the first ATC station; and if the UAV receives from the second ATC station information indicating that the second ATC station is not able to connect to the first ATC station, determining that no ATC station is emitting a flight-plan for the region.

(7) The method of (6), wherein determining whether any ATC station is emitting a flight-plan for the region further comprises:

if the UAV receives from the second ATC station information that the second ATC station is able to connect to the first ATC station, requesting the second ATC station to obtain the flight-plan for the region from the first ATC station and transmit it to the UAV.

(8) The method of any of (1) to (5), wherein determining whether any ATC station is emitting a flight-plan for the region comprises:

determining that a previously existing connection to a first ATC station emitting a flight-plan for the region is lost, that it is not possible to establish a connection to the ATC station or that the UAV entered an area not served by an ATC station;

attempting to establish a connection to one of the other UAVs;

if the connection to the one of the other UAVs can be established, requesting the one of the other UAVs to connect to the first ATC station; and if the UAV receives from the one of the other UAVs information indicating that one of the other UAVs is not able to connect to the first ATC station, determining that no ATC station is emitting a flight-plan for the region.

(9) The method of (8), wherein determining whether any ATC station is emitting a flight-plan for the region further comprises:

if the connection to the one of the other UAVs cannot be established, performing a fallback procedure.

(10) The method of (8) or (9), wherein determining whether any ATC station is emitting a flight-plan for the region further comprises:

if the UAV receives from the one of the other UAVs information indicating that one of the other UAVs is able to connect to the first ATC station, establishing a connection to the first ATC center via the one of the other UAVs.

(11) An UAV comprising a plurality of rotors and circuitry configured to:

determine whether any ATC station is emitting a flight-plan for a region;

if it is determined that no ATC station is emitting a flight-plan for the region, determine a score for the UAV based on properties of the UAV and receive scores from other UAVs within the region;

determine whether the UAV is a master UAV or a slave UAV for generating the temporary flight-plan based on the determined score for the UAV and the received scores from the other UAVs;

perform a first task in generating the temporary flight-plan if it is determined that the UAV is a master UAV; and perform a second task in generating the temporary flight-plan if it is determined that the UAV is a slave UAV.

(12) The UAV of (11), wherein, for performing the first task, the circuitry is configured to:

determine calculation tasks for generating the temporary flight-plan;

transmit the calculation tasks to at least part of the other UAVs;

receive solutions for the calculation tasks from at least part of the other UAVs; and determine the temporary flight-plan based on the received solutions for the calculation tasks.

(13) The UAV of (12), wherein, for performing the first task, the circuitry is configured to determine which of the other UAVs exhibit a score satisfying a predetermined condition, wherein the circuitry is configured to determine calculation tasks only for UAVs among the other UAVs which exhibit a score satisfying the predetermined condition.

(14) The UAV of any of (11) to (13), wherein, for performing the second task, the circuitry is configured to:

receive a calculation task for generating the temporary flight-plan from one of the other UAVs;

determine a solution for the received calculation task; and transmit the solution for the calculation task to the one of the other UAVs.

(15) The UAV of any of (11) to (14), wherein the properties of the UAV comprise at least one of the following: an amount of surplus energy available at the UAV, a computational capability of the UAV, and a connection quality of the UAV to the other UAVs.

(16) The UAV of any of (11) to (15), wherein, for determining whether any ATC station is emitting a flight-plan for the region, the circuitry is configured to:

determine that a previously existing connection to a first ATC station emitting a flight-plan for the region is lost or that it is not possible to establish a connection to the ATC station;

request at least a second ATC station to check whether the second ATC station is able to connect to the first ATC station; and if the UAV receives from the second ATC station information indicating that the second ATC station is not able to connect to the first ATC station, determine that no ATC station is emitting a flight-plan for the region.

(17) The UAV of (16), wherein, for determining whether any ATC station is emitting a flight-plan for the region, the circuitry is further configured to:

if the UAV receives from the second ATC station information that the second ATC station is able to connect to the first ATC station, request the second ATC station to obtain the flight-plan for the region from the first ATC station and transmit it to the UAV.

(18) The UAV of any of (11) to (15), wherein, for determining whether any ATC station is emitting a flight-plan for the region, the circuitry is configured to:

determine that a previously existing connection to a first ATC station emitting a flight-plan for the region is lost, that it is not possible to establish a connection to the ATC station or that the UAV entered an area not served by an ATC station;
attempt to establish a connection to one of the other UAVs;
if the connection to the one of the other UAVs can be established, request the one of the other UAVs to connect to the first ATC station; and
if the UAV receives from the one of the other UAVs information indicating that one of the other UAVs is not able to connect to the first ATC station, determine that no ATC station is emitting a flight-plan for the region.

(19) The UAV of (18), wherein, for determining whether any ATC station is emitting a flight-plan for the region, the circuitry is further configured to:
if the connection to the one of the other UAVs cannot be established, perform a fallback procedure.

(20) The UAV of (18) or (19), wherein, for determining whether any ATC station is emitting a flight-plan for the region, the circuitry is further configured to:
if the UAV receives from the one of the other UAVs information indicating that one of the other UAVs is able to connect to the first ATC station, establish a connection to the first ATC center via the one of the other UAVs.

(21) A non-transitory machine readable medium having stored thereon a program having a program code for performing the method for generating a temporary flight-plan for a region according to any of (1) to (10), when the program is executed on a processor or a programmable hardware.

(22) A program having a program code for performing the method for generating a temporary flight-plan for a region according to any of (1) to (10), when the program is executed on a processor or a programmable hardware.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in a non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for an Unmanned Aerial Vehicle, UAV, for generating a temporary flight-plan for a region, the method comprising:
   determining whether any air traffic control station is emitting a flight-plan for the region;
   in a case that if it is determined that no air traffic control station is emitting a flight-plan for the region, determining a score for the UAV based on properties of the UAV and receiving scores from other UAVs within the region;
   determining whether the UAV is a master UAV or a slave UAV for generating the temporary flight-plan based on the determined score for the UAV and the received scores from the other UAVs;
   performing a first task in generating the temporary flight-plan if it is determined that the UAV is a master UAV; and
   performing a second task in generating the temporary flight-plan if it is determined that the UAV is a slave UAV;
   for each UAV among the UAV and the other UAVs, creating an initial table including its own ID and score, transmitting its table to the other UAVs, continuously updating its local table based on received tables from the other UAVs for a predetermined time period until all local tables at the UAVs are identical, and determining the master UAV and slave UAVs based on the identical local tables,
   wherein the temporary flight-plan describes respective temporal-spatial regions exclusively reserved for each UAV navigating in the region to avoid collisions between the UAVs in the absence of air traffic control, the temporary flight-plan comprising a three-dimensional position over time and a reserved surrounding space for each UAV that includes the UAV extent, cargo extent, and safety margins to compensate for external influences, navigation uncertainties, and sensor uncertainties.

2. The method of claim 1, wherein performing the first task in generating the temporary flight-plan comprises:

determining calculation tasks for generating the temporary flight-plan;
transmitting the calculation tasks to at least part of the other UAVs;
receiving solutions for the calculation tasks from at least part of the other UAVs; and
determining the temporary flight-plan based on the received solutions for the calculation tasks.

3. The method of claim 2, wherein performing the first task in generating the temporary flight-plan for the region further comprises determining which of the other UAVs exhibit a score satisfying a predetermined condition, wherein the UAV determines calculation tasks only for UAVs among the other UAVs which exhibit a score satisfying the predetermined condition.

4. The method of claim 1, wherein performing the second task in generating the temporary flight-plan comprises:
receiving a calculation task for generating the temporary flight-plan from one of the other UAVs;
determining a solution for the received calculation task; and
transmitting the solution for the calculation task to the one of the other UAVs.

5. The method of claim 1, wherein the properties of the UAV comprise at least one of the following: an amount of surplus energy available in the UAV, a computational capability of the UAV, and a connection quality of the UAV to the other UAVs.

6. The method of claim 1, wherein determining whether any air traffic control station is emitting a flight-plan for the region comprises:
determining that a previously existing connection to a first air traffic control station emitting a flight-plan for the region is lost or that it is not possible to establish a connection to the air traffic control station;
requesting at least a second air traffic control station to check whether the second air traffic control station is able to connect to the first air traffic control station; and
if the UAV receives from the second air traffic control station information indicating that the second air traffic control station is not able to connect to the first air traffic control station, determining that no air traffic control station is emitting a flight-plan for the region.

7. The method of claim 6, wherein determining whether any air traffic control station is emitting a flight-plan for the region further comprises:
if the UAV receives from the second air traffic control station information that the second air traffic control station is able to connect to the first air traffic control station, requesting the second air traffic control station to obtain the flight-plan for the region from the first air traffic control station and transmit it to the UAV.

8. The method of claim 1, wherein determining whether any air traffic control station is emitting a flight-plan for the region comprises:
determining that a previously existing connection to a first air traffic control station emitting a flight-plan for the region is lost, that it is not possible to establish a connection to the air traffic control station or that the UAV entered an area not served by an air traffic control station;
attempting to establish a connection to one of the other UAVs;
if the connection to the one of the other UAVs can be established, requesting the one of the other UAVs to connect to the first air traffic control station; and
if the UAV receives from the one of the other UAVs information indicating that one of the other UAVs is not able to connect to the first air traffic control station, determining that no air traffic control station is emitting a flight-plan for the region.

9. The method of claim 8, wherein determining whether any air traffic control station is emitting a flight-plan for the region further comprises:
if the connection to the one of the other UAVs cannot be established, performing a fallback procedure.

10. The method of claim 8, wherein determining whether any air traffic control station is emitting a flight-plan for the region further comprises:
if the UAV receives from the one of the other UAVs information indicating that one of the other UAVs is able to connect to the first air traffic control station, establishing a connection to the first air traffic control center via the one of the other UAVs.

11. An Unmanned Aerial Vehicle, UAV, comprising a plurality of rotors and circuitry configured to:
determine whether any air traffic control station is emitting a flight-plan for a region;
if it is determined that no air traffic control station is emitting a flight-plan for the region, determine a score for the UAV based on properties of the UAV and receive scores from other UAVs within the region;
determine whether the UAV is a master UAV or a slave UAV for generating the temporary flight-plan based on the determined score for the UAV and the received scores from the other UAVs;
perform a first task in generating the temporary flight-plan if it is determined that the UAV is a master UAV; and
perform a second task in generating the temporary flight-plan if it is determined that the UAV is a slave UAV,
wherein the UAV creates an initial table including its own ID and score, transmits its table to the other UAVs, continuously updates its local table based on received tables from the other UAVs for a predetermined time period until all local tables at the UAVs are identical, and determines the master UAV and slave UAVs based on the identical local tables, and
wherein the temporary flight-plan describes respective temporal-spatial regions exclusively reserved for each UAV navigating in the region to avoid collisions between the UAVs in the absence of air traffic control, the temporary flight-plan comprising a three-dimensional position over time and a reserved surrounding space for each UAV that includes the UAV extent, cargo extent, and safety margins to compensate for external influences, navigation uncertainties, and sensor uncertainties.

12. The UAV of claim 11, wherein, for performing the first task, the circuitry is configured to:
determine calculation tasks for generating the temporary flight-plan;
transmit the calculation tasks to at least part of the other UAVs;
receive solutions for the calculation tasks from at least part of the other UAVs; and
determine the temporary flight-plan based on the received solutions for the calculation tasks.

13. The UAV of claim 12, wherein, for performing the first task, the circuitry is configured to determine which of the other UAVs exhibit a score satisfying a predetermined condition, wherein the circuitry is configured to determine calculation tasks only for UAVs among the other UAVs which exhibit a score satisfying the predetermined condition.

14. The UAV of claim 11, wherein, for performing the second task, the circuitry is configured to:
receive a calculation task for generating the temporary flight-plan from one of the other UAVs;
determine a solution for the received calculation task; and
transmit the solution for the calculation task to the one of the other UAVs.

15. The UAV of claim 11, wherein the properties of the UAV comprise at least one of the following: an amount of surplus energy available in the UAV, a computational capability of the UAV, and a connection quality of the UAV to the other UAVs.

16. The UAV of claim 11, wherein, for determining whether any air traffic control station is emitting a flight-plan for the region, the circuitry is configured to:
determine that a previously existing connection to a first air traffic control station emitting a flight-plan for the region is lost or that it is not possible to establish a connection to the air traffic control station;
request at least a second air traffic control station to check whether the second air traffic control station is able to connect to the first air traffic control station; and
if the UAV receives from the second air traffic control station information indicating that the second air traffic control station is not able to connect to the first air traffic control station, determine that no air traffic control station is emitting a flight-plan for the region.

17. The UAV of claim 16, wherein, for determining whether any air traffic control station is emitting a flight-plan for the region, the circuitry is further configured to:
if the UAV receives from the second air traffic control station information that the second air traffic control station is able to connect to the first air traffic control station, request the second air traffic control station to obtain the flight-plan for the region from the first air traffic control station and transmit it to the UAV.

18. The UAV of claim 11, wherein, for determining whether any air traffic control station is emitting a flight-plan for the region, the circuitry is configured to:
determine that a previously existing connection to a first air traffic control station emitting a flight-plan for the region is lost, that it is not possible to establish a connection to the air traffic control station or that the UAV entered an area not served by an air traffic control station;
attempt to establish a connection to one of the other UAVs;
if the connection to the one of the other UAVs can be established, request the one of the other UAVs to connect to the first air traffic control station; and
if the UAV receives from the one of the other UAVs information indicating that one of the other UAVs is not able to connect to the first air traffic control station, determine that no air traffic control station is emitting a flight-plan for the region.

19. The UAV of claim 18, wherein, for determining whether any air traffic control station is emitting a flight-plan for the region, the circuitry is further configured to:
if the connection to the one of the other UAVs cannot be established, perform a fallback procedure.

20. The UAV of claim 18, wherein, for determining whether any air traffic control station is emitting a flight-plan for the region, the circuitry is further configured to:
if the UAV receives from the one of the other UAVs information indicating that one of the other UAVs is able to connect to the first air traffic control station, establish a connection to the first air traffic control center via the one of the other UAVs.

* * * * *